United States Patent [19]

Rossow

[11] Patent Number: 5,241,866

[45] Date of Patent: Sep. 7, 1993

[54] PROBE SHAPES THAT MEASURE TIME-AVERAGED STREAMWISE MOMENTUM AND CROSS-STREAM TURBULENCE INTENSITY

[75] Inventor: Vernon J. Rossow, Los Altos, Calif.

[73] Assignee: The United States of America respresented by the Administrator of National Aeronautics and Space Administration, Washington, D.C.

[21] Appl. No.: 660,473

[22] Filed: Feb. 21, 1991

[51] Int. Cl.$^5$ ................................................ G01F 1/46
[52] U.S. Cl. ............................ 73/861.66; 73/170.14; 73/147; 73/180
[58] Field of Search ........... 73/861.65, 861.66, 861.67, 73/861.68, 182, 180, 189, 861.42

[56] References Cited

U.S. PATENT DOCUMENTS

| | | | |
|---|---|---|---|
| 3,318,146 | 5/1967 | De Leo et al. | 73/180 |
| 3,392,585 | 7/1968 | Bentz et al. | 73/861.65 |
| 3,673,866 | 7/1972 | Alperovich et al. | 73/861.65 |
| 4,615,213 | 10/1988 | Hagen | 73/180 |
| 4,718,273 | 1/1988 | McCormack | 73/180 |
| 4,754,651 | 7/1988 | Shortridge et al. | 73/861.65 |
| 4,836,019 | 6/1989 | Hagen et al. | 73/182 |
| 4,942,763 | 7/1990 | Harpster | 73/202.5 |
| 5,025,661 | 6/1991 | McCormack | 73/180 |

OTHER PUBLICATIONS

"Applied Hydro- and Aeromechanics" O. G. Tietjens, Engineering Societies Monographs 1934, pp. 226–235.
Luftfahrtforschung, vol. XII, No. 2, May 16, 1935, Technical Memorandums National Advisory Committee for Aeronautics, No. 775, "Total-Head Meter with Small Sensitivity to Yaw" by G. Kiel, pp. 1–6, FIGS. 1–13.
Technical Notes, National Advisory Committee for Aeronautics, No. 546, "Comparative Tests of Pitot--Static Tubes", by Kenneth G. Merriam et al., Nov. 1935, pp. 1–5 and 32.
"A Note on the Measurement of Total Head and Static Pressure in a Turbulent Stream", S. Goldstein, pp. 570–575.
"Considerations Entering into the Selection of Probes for Pressure Measurement in Jet Engines", C. C. Gettelman et al., Instrument Society of America, Aeronautics Inst. Session 11, Paper No. 52-12-1, pp. 134–137.
"On the Static Pressure in Fully-Developed Turbulent Flow", A. Page, Proc. Roy. Society of London, Series A, vol. 155, Jul. 1, 1936, pp. 576–596.
National Advisory Committee for Aeronautics, ACR No. 3L23, Wartime Report, "Investigation of Flow in an Axially Symmetrical Heated Jet of Air", S. Corrsin, pp. 1–34 and FIGS. 1–43.
"Response of Pitot probes in turbulent streams", H. A. Becker et al., J. Fluid Mech. (1974), vol. 62, part 1, pp. 85–114.

Primary Examiner—Herbert Goldstein
Assistant Examiner—Raymond Y. Mah
Attorney, Agent, or Firm—Darrell G. Brekke; Guy Miller; John R. Manning

[57] ABSTRACT

A method and apparatus for directly measuring the time-averaged streamwise momentum in a turbulent stream use a probe which has total head response which varies as the cosine-squared of the angle of incidence. The probe has a nose with a slight indentation on its front face for providing the desired response. The method of making the probe incorporates unique design features. Another probe may be positioned in a side-by-side relationship to the first probe to provide a direct measurement of the total pressure. The difference between the two pressures yields the sum of the squares of the cross-stream components of the turbulence level.

24 Claims, 11 Drawing Sheets

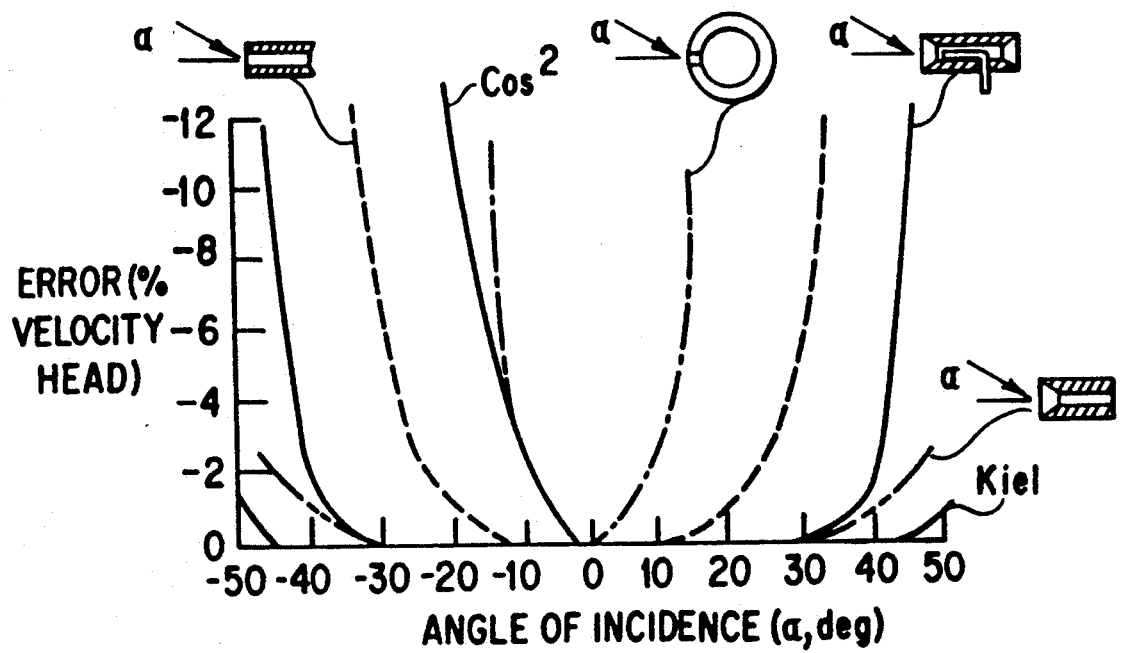
FIG. 2
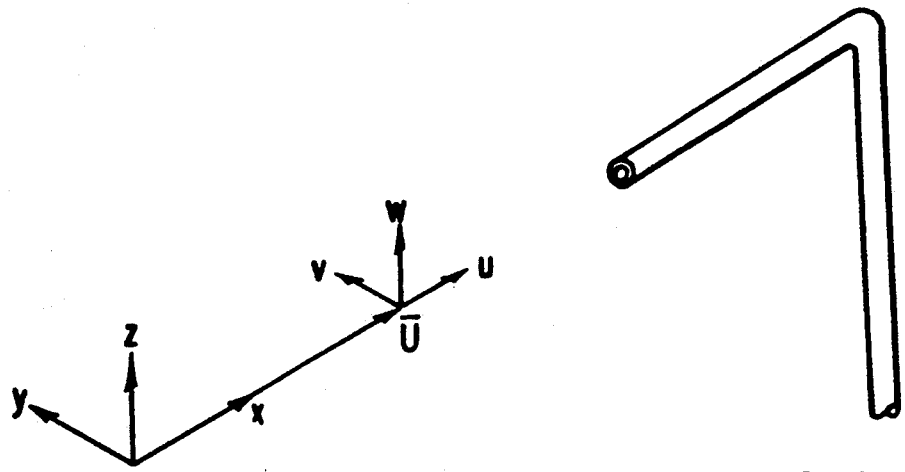
FIG. 3a
FIG. 3b

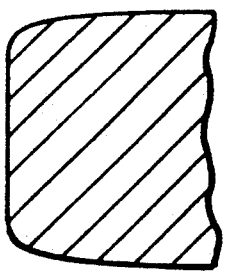 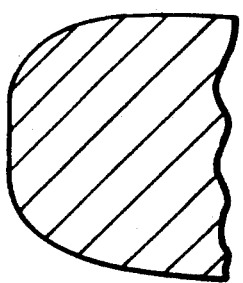 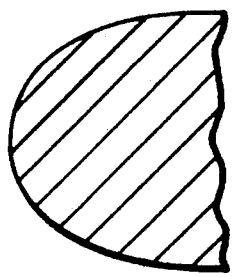 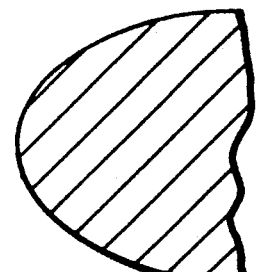
FIG.5a  FIG.5b  FIG.5c  FIG.5d
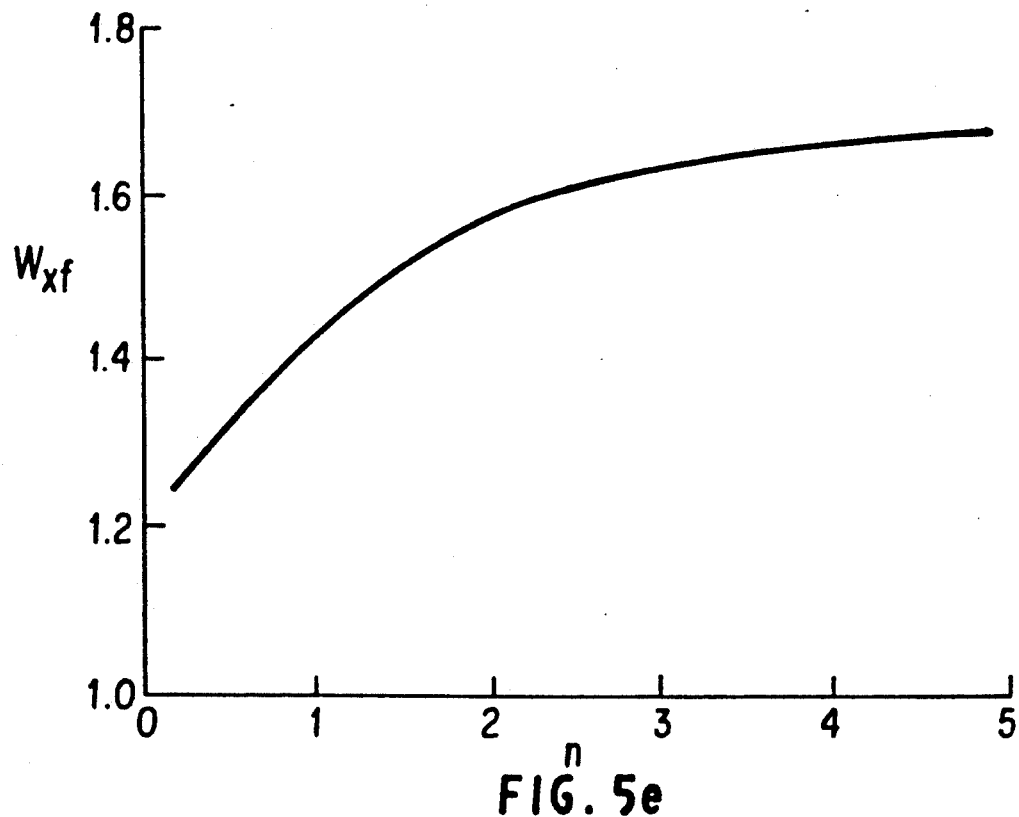
FIG. 5e

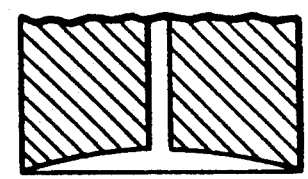
FIG. 11a  $R_e=0.0$
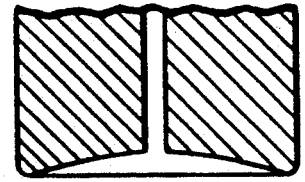
FIG. 11b  $R_e=0.05$
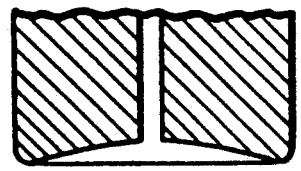
FIG. 11c  $R_e=0.1$
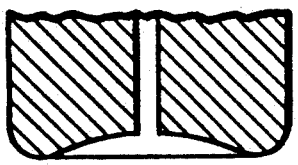
FIG. 11d  $R_e=0.2$
FIG. 11e  $R_e=0.3$
FIG. 11f  $R_e=0.4$
FIG. 11g  $R_e=0.5$
FIG. 11h  $R_e=0.6$

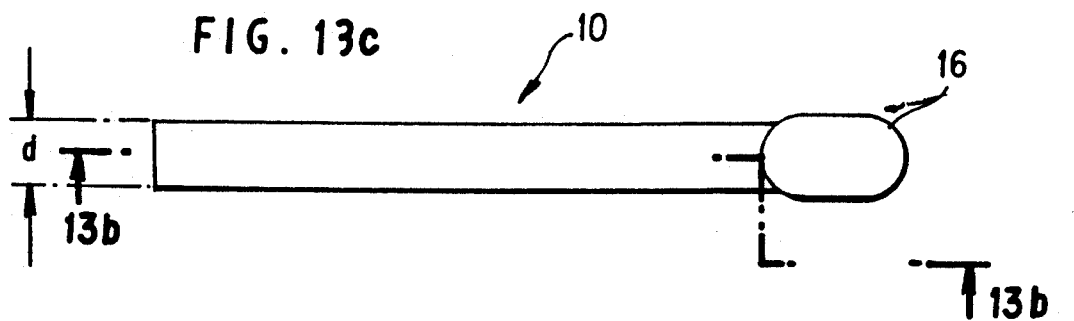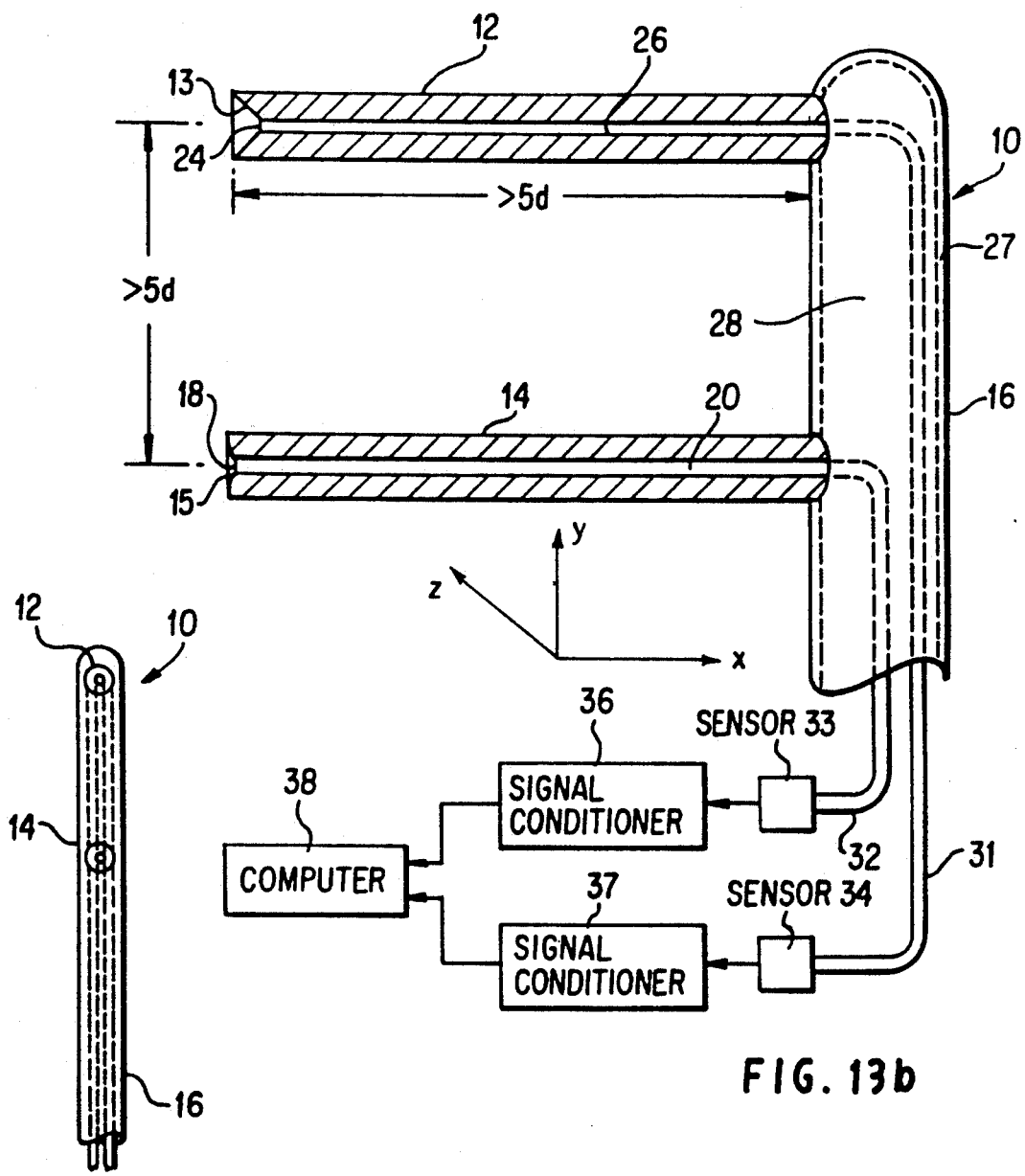

PROBE SHAPES THAT MEASURE TIME-AVERAGED STREAMWISE MOMENTUM AND CROSS-STREAM TURBULENCE INTENSITY

ORIGIN OF THE INVENTION

The invention described herein was made by an employee of the U.S. government and may be manufactured and used by or for the government without the payment of any royalties thereon or therefor.

BACKGROUND OF THE INVENTION

The present invention is directed to probe shapes for the measurement of time-averaged streamwise momentum and cross-stream turbulence intensity in a turbulent fluid stream and, more particularly, to the measurement of time-averaged streamwise momentum and cross-stream turbulence intensity based on only the streamwise component of the velocity of the fluid stream.

Probes have long been used to measure the total and static pressures in a stream to determine its dynamic pressure, velocity or momentum. Probes indicate the total and static pressures at a specific location in the flow field both simply and without greatly disturbing the surrounding fluid. Since many of the flow fields where these probes are used have low levels of turbulence (i.e., less than 1%), the measurement of total and static pressures is not influenced, to a measurable extent, by the dynamic pressures associated with eddies. However, when measurements are desired in flow fields where the turbulence levels are high, the eddies carry with them significant variations in static and dynamic pressure, and they also generate angles of incidence relative to the probe axis large enough to cause significant errors in the measured quantities. Turbulence levels of such a magnitude occur when the flow field contains energetic shear layers like those found in regions of combustion, along the sides of jets, and in thrust augmenters wherein streams of two different energy levels are mixed and then decelerated. The deceleration lowers the average velocity of the stream without a comparable change in the magnitude and intensity of the eddies. In these kinds of flow fields, the local value of the relative turbulence intensity can exceed 40%. When such a condition is present, the large variations in local flow direction, static pressure and total head associated with the eddies require that specially designed probe shapes and associated data reduction methods be used to determine the true time-averaged values.

The response of a probe can be quite complex if the probe dimensions are about the same as the eddy sizes, because the flow around the probe is a mixture of several separate flow fields. If, however, the probe is small compared with a typical eddy size, the instantaneous flow field over that part of the probe containing the orifice at which the pressure measurements are made can be approximated by quasi-steady-state theories and experiments. A major source of error arises from the type of response that a given probe shape has to the angle of incidence that is not accounted for in the interpretation of the data. Other factors such as the time-dependent response of the probe flow field to eddy fluctuations and to viscous effects may also contribute to measurement error. The role of the probe shape as having a dominant effect on probe response to angle of incidence is used to develop probe systems that help to determine the properties of highly turbulent streams.

The beginning of the use of pressure probes immersed in a fluid appears to have occurred around 1732 when H. Pitot introduced the idea of placing a probe in a stream to measure the stagnation or impact pressure of water flowing through a duct. Since static pressure was measured at an orifice in the sidewall of the tube, the velocity of the stream could be determined by Bernoulli's equation. Incorporation of these concepts into a single probe embedded in the stream which is capable of making both a total head and a static pressure measurement was introduced by Prandtl (Prandtl et al., *Applied Hydro- and Aeromechanics*, McGraw-Hill Book Co., Inc., 1934) around 1920. He also made recommendations for the design of the installation so that the effects of the probe and its support on the measurements are minimized. The Prandtl probe functions satisfactorily when its inclination to the flow is small but significant error develops in the measurement of both static and total pressure if the flow angle relative to the probe axis is larger than about 10°.

A substantial improvement was made in the acceptance angle of total head probes when G. Kiel (Kiel, "Total Head Meter with Small Sensitivity to Yaw", NACA TM 775, 8/1935) introduced the concept of placing a shroud or shield around the nose of the probe. The shroud increases the capability of the probe to recover the entire stagnation pressure to angles of incidence of 45° or more. Probes of these or related designs are very important in fluid mechanics because of their ability to measure the stream velocity (or the velocity of an aircraft). It is not surprising that a number of studies were undertaken to find more versatile designs and to evaluate the various design parameters in order to minimize measurement errors. One of the earlier papers on the performance of a number of probe configurations was written by Merriam and Spaulding (Merriam et al., "Comparative Tests of Pitot-Static Tubes", NACA TN 546, 11/1935). Subsequent use of these devices and numerous studies of their characteristics are embedded throughout the literature on fluid mechanics.

Extension of steady-state concepts to measurements in unsteady or turbulent flow fields appears to have begun in the early 1930's when it was recognized that turbulence can bring about enough flow angularity, and possibly unsteady-state effects, to influence the magnitude of both total and static pressure measurements. These conjectures were given support by the work of Goldstein (Goldstein, "A Note on the Measurement of Total Head and Static Pressure in a Turbulent Stream", Proceedings of the Royal Society, Series A, Vol. 155, 1936) who derived a correction that is based on the assumption that the time-average of the static pressure and the dynamic pressure is constant along a streamline. He then assumed that the total-head probe being used in the experiment measured the sum of the static pressure and the dynamic pressure associated with the streamwise velocity and with all three components of the turbulence. He did this without making any assumptions regarding the shape of the probe or its response to flow incidence. Without a satisfactory explanation of his theory, Goldstein presented a similar result for the influence of turbulence on measured static pressure. Both of his relationships predict that the effect of turbulence enters the measurement as some factor times the square of the turbulence intensity. Measurements then made by Fage (Fage, "On the Static Pressure in Fully- Developed Turbulent Flow", Proceedings of the Royal Society, Series A, Vol. 155, 1936) in ducts of both circular and rectangular cross-section tended to confirm Goldstein's predictions. Although the results of Goldstein and Fage are open to dispute, they early demonstrated that turbulence in a stream can influence the total and static pressures by an amount that is proportional to the square of the magnitude of the cross-stream turbulence, but they did not make a direct connection with the probe shape and its response to flow incidence caused by the eddies.

Corrsin (Corrsin, "Investigation of Flow in an Axially Symmetrical Heated Jet of Air", NACA ARC No. 3L23, 12/1943) appears to be one of the first to meticulously explore the effect of turbulence on measurements being made in a free jet as it diffuses. The primary objective of his research was to obtain detailed measurements on the structure of free jets and to make comparisons with various theories. Of particular interest in his approach was the use of a mechanism to oscillate hot-wire probes laterally relative to a steady stream so that a calibration could be made of their response to a fluctuating stream. The response curve indicated that the relationship of indicated to actual fluctuations is linear up to about 50% turbulence. As the turbulence increases above 50%, the hot-wire measurement first indicates a value that is slightly larger than the true value. At turbulence levels above about 75%, the value indicated by the hot-wire measurement decreases as the intensity increases.

Investigations were carried out by NACA personnel to develop pressure probes for use in aerodynamic research. A wide variety of configurations was evaluated and guidelines were presented for the installation and use of Pitot/static probes (See Merriam et al. referenced above). One of the objectives of the research was to develop probes that are less sensitive to the angle of incidence in the measurement of stagnation pressure. Some of the configurations studied are illustrated in FIGS. 1a–1g. All of the shapes shown are circular in cross-section. Other cross-sections such as flattened ovals, squares, rectangles, etc. were tested in special situations (e.g., near walls).

The probe for measurement of total pressure with a hemispherical nose shown in FIG. 1a is a simple streamlined shape that is easy to build. Such a shape can be commonly used for a probe that measures both total and static pressure. Another similar shape shown in FIG. 1b has a spherical nose which can be built by drilling a hole through a ball bearing and mounting it on the end of a tube of smaller diameter. An even simpler design shown in FIG. 1c uses a tube that has been cut off so that it is square ended and has no streamlining. The philosophy of such a blunted probe is that the flow over the remainder of the tube is unimportant because measurements are not made downstream of the orifice where the stagnation pressure is measured. The same philosophy applies to the remaining probe shapes presented in FIGS. 1d–1g. A wide variety of internal and external shapes was tried.

The response of probes to flow incidence is of primary interest for making measurements in a turbulent stream. The curves in FIG. 2 present data on how the measured stagnation pressure is affected by angle of incidence. Also shown for comparison is a cosine-squared curve. The probe as shown in FIG. 1d with an internal taper leading to the pressure orifice and duct (where a pressure sensing device is located) has a much greater flow acceptance angle than the hemispherical or spherical nose shapes; that is, it measures the full stagnation pressure to larger flow incidence angles. The shrouded or shielded probes shown in FIG. 1f and expanded upon as shown in FIG. 1g provide an even broader range of incidence angles over which the entire stagnation pressure is recovered with negligible error. Full recovery of stagnation pressure to angles of incidence over 60° has been provided. A probe of this design immersed in a turbulent stream would include in its measurement the full recovery of total pressure of all eddies that induce angles of attack less than about 60°. The contributions of stronger eddies would also be included but not to the full extent.

The flow angularity in a turbulent stream can be measured by use of multiple probes grouped to respond differentially to an unknown flow angle. Other techniques which can be used to interpret measurements made in a turbulent stream include the hot-wire method, laser velocimeter and light-scatter technique.

The relationship between the shape of a probe and its response in a turbulent stream was studied thoroughly by Becker and Brown (Becker et al., "Response of Pitot-Probes in Turbulent Streams", Journal of Fluid Mechanics, Vol. 62, Pt. 1, 1974, pp. 85–114). They determined an equation corresponding to the response of various total-head probe designs to a steady-state flow angle, $\alpha$. Two constants, k and m, are used to adapt the equation to various experimentally determined response curves similar to those shown in FIG. 2, $$H_m - H = \frac{1}{2} \rho \bar{U}^2 [1 - K(\sin^2\alpha)^m] \qquad (1)$$

where $H_m$ is the measured stagnation pressure.

U.S. Pat. No. 4,836,019 to Hagen et al discloses a compact air data sensor wherein multiple components of a pressure are determined. A probe is constructed with an internally tapered head as shown in FIG. 1d and a circular cross-section. The internally tapered head is merged into the probe's body. The probe can be used to calculate static pressure, impact pressure, angle of attack and angle of sideslip but requires the application of correction factors to do so.

U.S. Pat. No. 3,673,866 to Alperovich et al discloses a pitot tube wherein the tube's measurements are used to determine total head pressure and static pressure. The tube's head section is hemispherical as shown in FIG. 1a and has an orifice which is aligned along the center axis of the tube. A method of compensating for errors in a pressure measurement is shown. The tube, as with standard Pitot tubes, generates significant measurement error if the flow angle relative to the probe axis is substantial.

U.S. Pat. No. 4,718,273 to McCormack discloses a combination alpha, static and total pressure probe wherein a central opening is used to measure total pressure. Several off-axis openings are used to determine angle of attack. Static pressure is measured using several other openings. Data must be interpreted to obtain the desired measurements.

SUMMARY OF THE INVENTION

An object of the present invention is to provide direct measurement of fluid turbulence characteristics.

Another object of the present invention is to provide measurement of fluid turbulence characteristics without reliance on assumptions regarding the nature of fluid turbulence.

A further object of the present invention is to provide measurement of fluid turbulence characteristics in a convenient, accurate manner.

To achieve the foregoing and other objects and advantages, and to overcome the shortcomings discussed above, the present invention includes a unique probe used in the measurement of time-averaged stagnation pressure in a turbulent fluid stream. The shape of the probe brings about a cosine-squared response in total pressure as the angle of incidence of the probe with the stream increases from zero. The unique probe shape enables the direct measurement of streamwise stagnation pressure. When used with a probe which measures the total stagnation pressure, one can also readily determine the cross-stream turbulence.

BRIEF DESCRIPTION OF THE DRAWINGS

The invention will be described in detail with reference to the allowing drawings in which like reference numerals refer to like elements and wherein:

FIG. 2 is a graphical representation of the response of various total pressure probes to angle of incidence;

FIGS. 3a and 3b are diagrams of a probe and a turbulent velocity field, respectivley;

FIG. 5a–5d illustrate nose shapes; FIG. 5e illustrates an across-axis velocity for the nose shapes according to $Z^2 = [X^n - nX]/(1-n)$;

FIGS. 11a–11h illustrate nose shapes composed of circular arcs;

FIGS. 13a–13c are front, side and top views, respectively, of a two-probe configuration for measurement of stagnation pressures.

DETAILED DESCRIPTION OF PREFERRED EMBODIMENTS

Figure 1A:
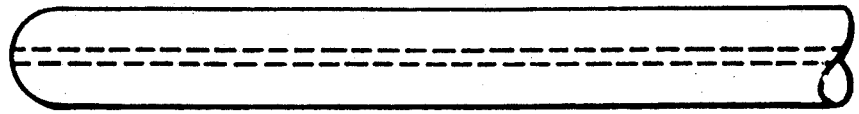
FIGS. 1a–1g illustrate known probe shapes used to measure pressure.
Figure 1B:
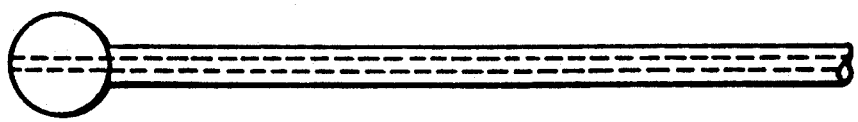
Figure 1C:
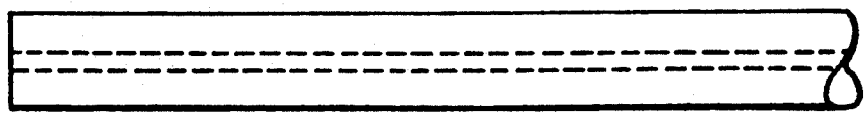

In accordance with the present invention, a unique probe is described herein which can be used in a turbulent stream to provide direct measurement of the streamwise component of the turbulence level. The probe has a shape such that the total pressure indicated by the probe varies as the cosine-squared of the angle of incidence of the probe with the stream. One particular probe shape which brings about the desired response includes a nose having a slight indentation on its front face which causes cross-stream velocity at the indentation to have a special relationship to free-stream velocity at the indentation. When used with a probe that measures total stagnation pressure, one can readily determine cross-stream turbulence.

Referring now to the drawings, the idealized performance of several probes will first be discussed in order to outline the concepts needed for determining the time-averaged stagnation pressure and the stagnation pressure based on the time-averaged streamwise component of the velocity.

The following nomenclature is used in accordance with the present disclosure:
H = stagnation pressure or total head
$\vec{i},\vec{j},\vec{k}$ = unit vectors in x,y,z directions
p = instantaneous value of static pressure
q = dynamic pressure = $\rho \overline{U}\infty^2/2$
r = radius
$r_e$ = radius of outer edge of probe face
$r_P$ = probe radius
$R = r/r_p$
t = time
u = fluctuating part of velocity component in stream direction
$\overline{U}$ = instantaneous value of local velocity in stream direction
U = time-averaged velocity in stream direction
v = fluctuating part of velocity component in lateral direction
V = instantaneous value of local velocity
w = fluctuating part of velocity component in vertical direction
x = distance in streamwise direction
y = distance in lateral direction
z = distance in vertical direction
α = angle of pitch
β = yaw angle
θ = meridian angle
ρ = air density
$W_{xf} = w_{xf}/w_\infty$
· Subscripts
c = centerline
d = centerline indentation of probe face
e = based on entire instantaneous local velocity
m = measured quantity
xf = flow transverse to centerline of probe at entrance to probe orifice
x = based on x component of velocity
∞ = free-stream value As illustrated in FIG. 2, a probe with an orifice facing into the stream measures or recovers different components of the static and dynamic pressure depending on its shape and the angle of incidence to the stream. The present discussion concentrates therefore on how the probe design affects the dynamic pressure components that are recovered. It is assumed that the time-averaged direction of the stream is aligned with the x-axis as shown in FIGS. 3a and 3b, and that its time-averaged magnitude is given by $$\overline{U} = \frac{1}{\Delta t}\int_0^{\Delta t} (U + u)dt \qquad (2)$$

where Δt is assumed to be a time interval sufficiently long that the magnitude of the averaged quality does not change if Δt is increased. The fluctuations of velocity about this value due to turbulence in the stream are given the instantaneous values u, v, and w which are taken to be aligned with the x, y, and z axes, respectively, as shown in FIG. 3b. The interaction of the turbulent eddies in the stream with the probe determines how the pressure measured at the orifice on the probe centerline deviates from the value it would indicate when the turbulence level is negligible. If the velocity fluctuations vanish, a wide variety of probes recover the sum of the static pressure, p, and the dynamic pressure, $$\frac{\rho}{2} \bar{U}^2,$$

for the total head, H, as given by Bernoulli's equation for incompressible flow, $$H = p + \frac{\rho}{2} \bar{U}^2.$$

In order to keep track of the various parts of the stream characteristics, a notation is used to define and relate the various pressure magnitudes. The instantaneous total or entire stagnation pressure, $H_e$, is based on the local instantaneous static pressure, p, and the entire instantaneous local velocity, V, as given by $$H_e = p + \frac{\rho}{2} V^2 = p + \frac{\rho}{2} [(\bar{U} + u)^2 + v^2 + w^2] \quad (3)$$

and its time-averaged value by $$\bar{H}_e = \bar{p} + \frac{\rho}{2} (\bar{U}^2 + \bar{u}^2 + \bar{v}^2 + \bar{w}^2) \quad (4)$$

Figure 1D:
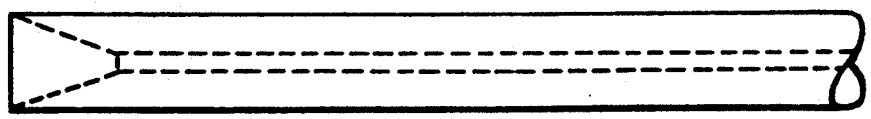
Figure 1E:
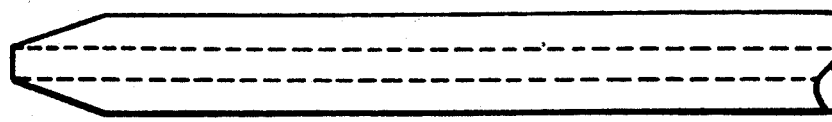
Figure 1F:
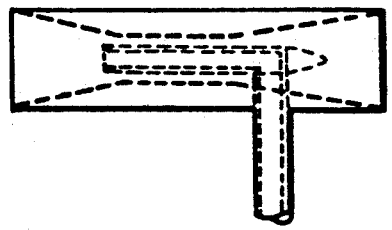
Figure 1G:
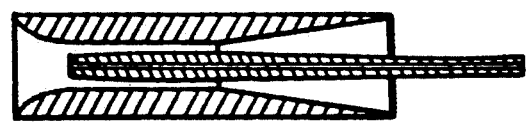

If a probe is used that has a very large acceptance angle (like the Kiel probe or an internally tapered tube, FIGS. 1f and 1d, respectively), the instantaneous stagnation pressure is given by Eq. (3) and the time-averaged value by Eq. (4). However, the total head used to determine the streamwise momentum uses only the streamwise component of the stream velocity. Its instantaneous value is given by $$H_x = p + \frac{\rho}{2} (\bar{U} + u)^2 \quad (5)$$

and the time-averaged value by $$\bar{H}_x = \bar{p} + \frac{\rho}{2\Delta t} \int_0^{\Delta t} (\bar{U} + u)^2 dt = \bar{p} + \frac{\rho}{2} (\bar{U}^2 + \bar{u}^2) \quad (6)$$

The difference between the two pressures expressed by Eqs. (4) and (6) eliminates both the static pressure and the streamwise component of velocity to yield $$(\bar{H}_e - \bar{H}_x) = \frac{\rho}{2} (\bar{v}^2 + \bar{w}^2) \quad (7)$$

The design of a probe that measures $\bar{H}_x$ is based on the observation that the instantaneous value of the velocity in the x direction may be written as $$\bar{U} + u = V\cos\alpha \quad (8)$$

where $\alpha$ is the instantaneous angle of incidence of the local flow relative to the probe axis. The quantity given by Eq. (5) may then be written as $$H_x = p + \frac{\rho}{2} (V\cos\alpha)^2 \quad (9)$$

In other words, a dynamic pressure based on $V^2\cos^2\alpha$ yields the desired response needed to evaluate the x-component of momentum. It then follows that the difference between the entire and the x-component of the instantaneous value of the two total heads may be written as $$H_e - H_x = \frac{\rho}{2} V^2\sin^2\alpha = \frac{\rho}{2} (v^2 + w^2) \quad (10)$$

The foregoing results are usually made dimensionless through division by the dynamic pressure. When the stream has a low turbulence level, the dynamic pressure is easily determined as the difference between the total head and the static pressure. However, when the turbulence level is high, uncertainties in both of these pressures require that the components be evaluated separately and the dimensionless parameters then calculated.

The forms of dynamic pressure available for use include one that is based on the average of the freestream velocity, $\bar{U}$, $$\bar{q} = \frac{\rho}{2} \bar{U}^2 \quad (11)$$

one that is based on the average of the dynamic pressure based on the x-component of the streamwise velocity, $(\bar{U}+u)$, $$\bar{q}_x = \frac{\rho}{2} [\bar{U}^2 + \bar{u}^2]$$

and one that is based on the average of the local velocity, $\bar{V}$, $$\bar{q}_e = \frac{\rho}{2} [\bar{U}^2 + \bar{u}^2 + \bar{v}^2 + \bar{w}^2].$$

Under moderate turbulence levels, the three values of dynamic pressure will probably not differ greatly. Since the conventional method used to make velocity components dimensionless is to divide by the time-average of the free-stream velocity, the dynamic pressure given by Eq. (11) is again used as the reference quantity. Eq. (7) may then be written as $$\frac{(\bar{H}_e - \bar{H}_x)}{\bar{q}} = \frac{(\bar{v}^2 + \bar{w}^2)}{\bar{U}^2} \quad (12)$$

which makes the difference between the two total head measurements directly equal to the sum of the two cross-stream turbulence levels.

Since the dynamic pressure based on the time-averaged velocity is not directly measured, its magnitude may be estimated by assuming that the three components of turbulence are equal in magnitude so that $$\frac{\overline{u^2}}{\overline{U^2}} = \frac{(\overline{v^2} + \overline{w^2})}{2\overline{U^2}} = \frac{(\overline{H}_e - \overline{H}_x)}{2\overline{q}}$$

The dynamic pressure, $\bar{q}$ is then found from $\overline{H}_x$ and the time-averaged static pressure. The relationship between total pressure and turbulence level given by Eq. (12) is insensitive when the level of turbulence is low because the velocity perturbations enter only as squared quantities. If a linear relationship is desired, instruments that do not rely on pressure will probably have to be used.

The interaction of a tube with the velocity fluctuations in the stream can be approximated by oscillating the probe in a uniform stream. A theoretical approximation to such an experiment is used here to estimate the effect of velocity fluctuations on the time-averaged pressure sensed by a stagnation pressure probe. The result presented by Lamb (Lamb, *Hydrodynamics*, Dover Publication, 1932) for the unsteady motion of a body is assumed to apply to the probes under consideration here. The time-dependent effects on pressure arise from the instantaneous velocity field and from the time-rate of change of the velocity potential as given by the equation $$p = \rho \frac{\partial \phi}{\partial t} - \frac{\rho}{2} V^2 + F(t) \quad (13)$$

where F(t) is set equal to zero because the pressure far from the oscillating body is constant with time. The quantity not considered in Eqs. (3)–(12) for pressure is the expression $$\frac{\partial \phi}{\partial t}$$

in Eq. (13). When the flow is incompressible, the velocity potential is proportional to the instantaneous velocity of the body relative to the fluid. It thereby represents the effect of the time-rate of change of the velocity fluctuations on the measured pressures. Since the expression $$\rho \frac{\partial \phi}{\partial t}$$

contains velocity only as the first power, the contribution to the pressure vanishes when an average over time is taken.

The foregoing result, obtained for inviscid flow, probably also applies to viscous flows because the flow over the front of impact-type probes is not greatly influenced by viscous effects or by any flow separation that might occur over the aft parts of the probe. It is concluded, therefore, that a time-dependent effect on pressure does not contribute to the measured time-averaged pressures.

A procedure will now be described for finding probe shapes that have the property that the total head they indicate falls off as the cosine-squared of the angle of incidence. As pointed out previously, a measurement made at an orifice on the forward centerline of such a probe would then yield directly the x-component of the total head. If the search for shapes that have the cosine-squared characteristic were to be carried out by a trial and error process in a wind tunnel, it would be very tedious and expensive. The more expeditious method is to calculate the inviscid flow over the probe by use of a panel method and then test likely designs in a wind tunnel. The design method is made even more expeditious by recognizing that the velocity of approach to the probe when at yaw or angle of incidence consists of one velocity component along the axis of the probe and another perpendicular to the probe axis. Since the velocity fields of the two components are independent of one another, the velocity potentials can be superimposed for a solution that applies when the probe is at yaw as shown in FIG. 4. Since the two potential flow solutions are independent, the cross-flow can be treated separately from the axial flow to find the response function to incidence defined here as including both angle of attack and of yaw). Since the axial flow component always yields a stagnation point at the orifice which is located at the forward centerline of the probe, it does not contribute to the velocity at the orifice in the determination of the shape. The flow component perpendicular to the probe axis, however, produces a non-zero velocity contribution at the orifice that depends on the shape of the nose of the probe. Determination of that contribution may be used to find nose shapes that yield the desired variation. In this way, it is unnecessary to calculate the pressure at the orifice location for a number of angles of attack and only the flow field due to the transverse component of the free-stream is calculated for each probe shape.

Figure 4A:
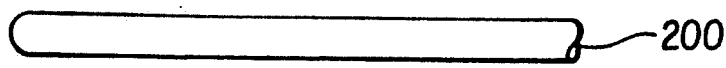
FIGS. 4a and 4b are diagrams of a probe and the resolution of flow field about the probe into axial and transverse components, respectively.
Figure 4B:
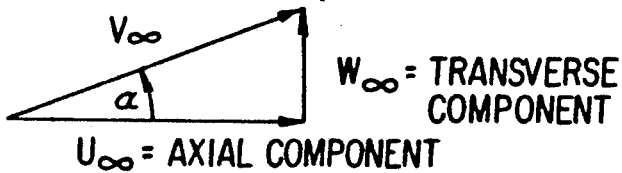

The foregoing simplification is carried out by first resolving the free-stream velocity about the probe into components along and perpendicular to the probe axis as in FIGS. 4a and 4b.

$$U_\infty = V_\infty \cos\alpha \quad (14a)$$

$$W_\infty = V_\infty \sin\alpha \quad (14b)$$

where the subscript indicates a point far from the probe. Since the probe orifice is located on the centerline 200 of the probe, the velocity at that location relative to the free-stream velocity determines the pressure measured by the probe as the yaw changes. It is assumed that the probe will have a surface (no matter how small) on the centerline that is perpendicular to the flow so that the axial flow always stagnates at the location of the orifice. The contribution of the cross-flow to the velocity at that point is then the only parameter that will change as the shape of the probe changes. The component of the free-stream velocity transverse, or normal, to the probe axis at the entrance to the probe orifice is designated by the symbol, $W_{xf} = w_{xf}/W_\infty$, where $W_\infty$ is the cross-stream velocity far i.e., at a position spaced from the probe. The pressure coefficient at the orifice is then given by $$C_{pxf} = 1 - W_{xf}^2 \sin^2\alpha. \quad (15)$$

As an example of how Eq. (15) works, consider a probe composed of a spherical head mounted on a tube of much smaller diameter. The velocity at an orifice on the forward centerline due to a cross flow is (from potential flow past a sphere) 1.5 times the oncoming flow velocity. By Eq. (15), the pressure coefficient at the orifice function of angle of attack is given by $$C_{pxf} = 1 - (1.5)^2 \sin^2\alpha = 1 - 2.25\sin^2\alpha$$

and therefore deviates appreciably from a cosine-squared relationship. The comparable expression for a circular cylinder placed along the y-axis is given by $$C_{pxf} = 1 - 4\sin^2\alpha$$

which also deviates from the desired function.

The problem now is to find a probe shape that has a free-stream velocity component of $W_{xf} = 1$ so that the pressure coefficient at the orifice as a function of angle of incidence becomes $$C_{pxf} = 1 - \sin^2\alpha = \cos^2\alpha \quad (16)$$

which is the variation being sought for the probe that is to measure the total head based on the x-component of velocity. Thus, in accordance with the definition of the term coefficient, the total head based on the x-component of velocity equals the pressure coefficient multiplied by the measured pressure.

By means of the foregoing step, the problem has been reduced to one wherein the shape of the probes can be found by an iterative process. The analysis proceeds by calculating the flow field due to a transverse velocity or cross-flow over several families of shapes to find out how the parameter, $W_{xf}$, is affected by probe shape. By successive iterations, one or more shapes are found wherein $W_{xf} = 1$. The shapes that satisfy such a criterion are then examined to find out which are most easily constructed and which are least sensitive to construction inaccuracies.

In order to gain experience with the manner in which the nose centerline pressures vary with probe shape, a family of shapes was studied consisting of nose shapes that were deviations from a semi-circle as given by the equation $$Z^2 = [X^n - nX]/(1 - n) \quad (17)$$

where Z is the vertical distance to the edge of the semi-circle and the equation is written for the Y=0 plane, the probe being axially symmetric with $X = x/r_p$, $Z = z/r_p$, and n is a parameter that governs the nose profile as shown in FIGS. 5a-d. When n=2, the equation produces a hemispherical nose (FIG. 5c). When low values of n just above zero are used, shapes are generated that are nearly flat-faced cylinders (FIGS. 5a and 5b). Values of n above two produce nose shapes that are rounded but more elongated than hemispherical (FIG. 5d). The component of the free-stream velocity transverse to the probe axis at the orifice location, $W_{xf}$, is presented in FIG. 5e for a range of n values to illustrate how the shape affects the cross-flow velocity at the forward centerline point for such a family of shapes. As the nose becomes elongated (n>2), the free-stream velocity components at the orifice, $W_{xf}$, approaches an asymptote around 1.7. As the nose becomes more flattened (e.g., n=0.2), the free-stream velocity component at the orifice decreases but never becomes one or less than one. These results show that the trend is downward at low values of n, suggesting that another family of curves is needed that produces slightly indented nose shapes in order to bring the full stream velocity component to one or below.

Figure 6A:
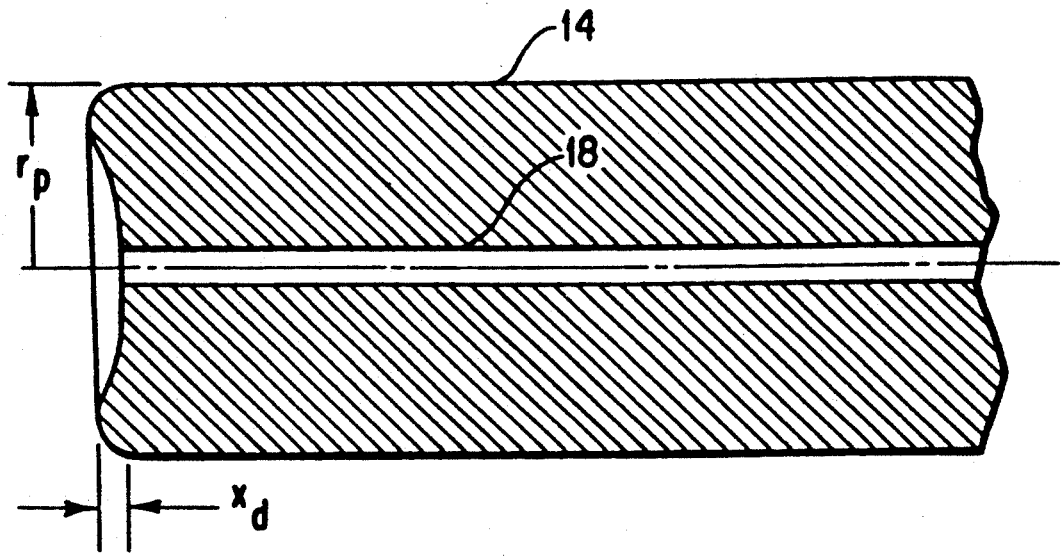
FIGS. 6a and 6b illustrate a nose shape and across-axis velocity therefor according to $X = CZ^2(1-Z^2)\ln(\cos \pi Z/2)$.
Figure 6B:
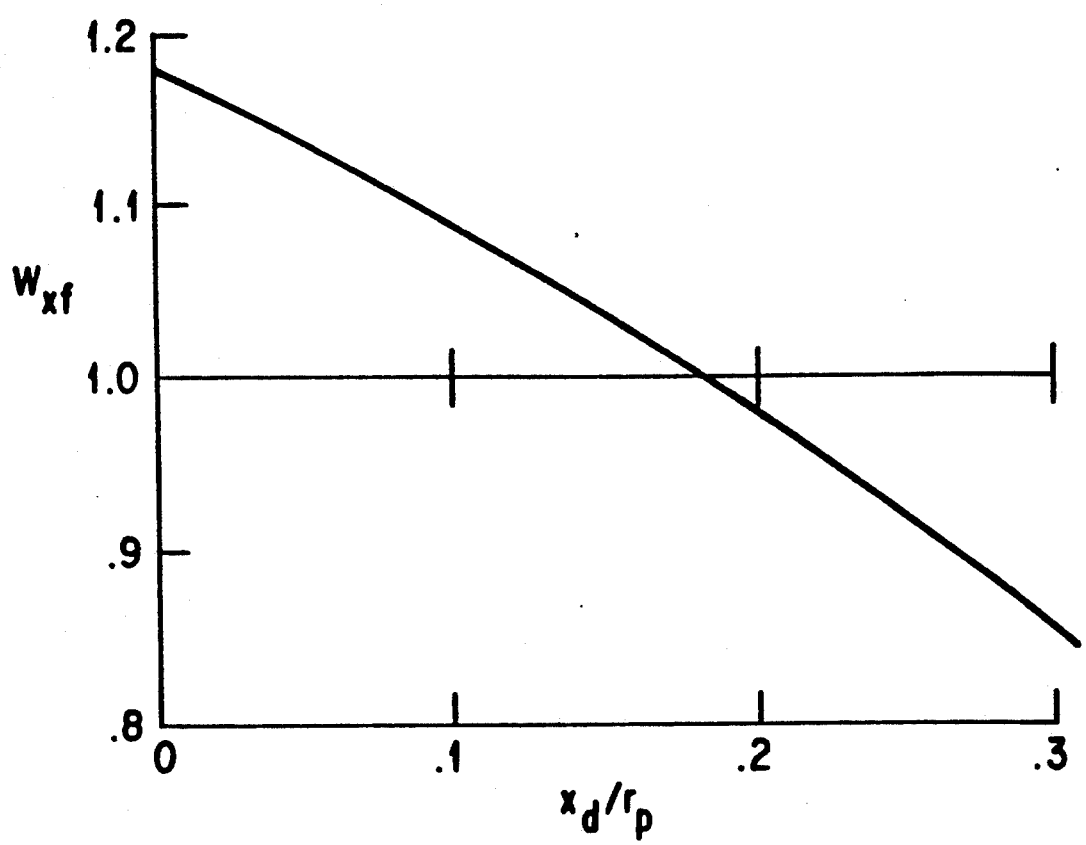

In order to explore how a centerline indentation in the nose shape affects the variation of stagnation pressure with angle of incidence, a family of shapes described by the equation $$X = CZ^2(1 - Z^2)\ln(\cos\pi Z/2) \quad (18)$$

was then studied. The parameter Z is the vertical distance to the indentation. The parameter is a constant that governs the amount of indentation. It was found that an indentation of $X_d = x_d/r_p = 0.18293$ (C=0.62717) yields a value of $W_{xf} = 1$ as desired. The nose shape that corresponds to that condition is shown in FIG. 6a, and FIG. 6b illustrates a graph of the variation of the free-stream velocity component, $W_{xf}$, for a range of $X_d$. Although the shapes defined by Eq. (18) would probably function close to the desired way, a disadvantage of these shapes is that the radius at the outer edge of the probe was rather small and very little control was available for the profiles.

Figure 7A:
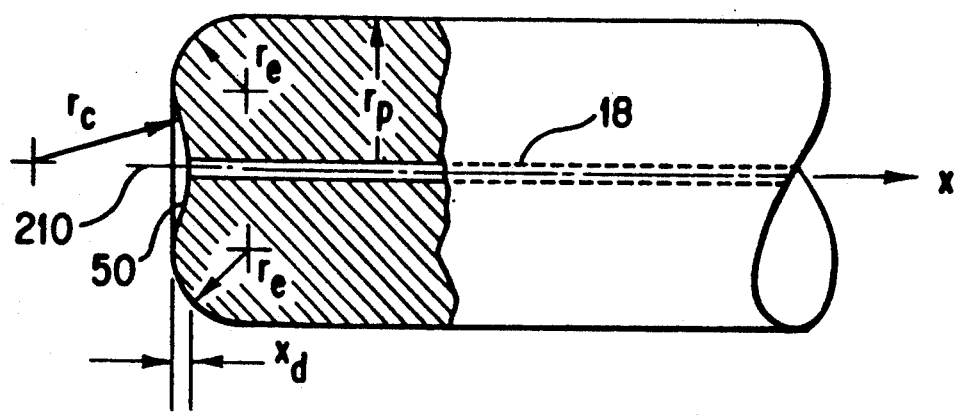
FIGS. 7a and 7b illustrate a nose shape defined by circular arcs and an across-axis velocity variation as a function of indentation.

The results presented in FIGS. 5a-5e, 6a and 6b suggest the study of probe shapes composed of circular arcs as illustrated in FIG. 7a. Equations are presented for the shape as a function of the amount of indentation and of the radius of curvature of the outer edge of the probe (once again the profile is defined in the Y=0 plane). The radius of the circle that defines the shape of the center of the probe is then given by:

$$R_c = [(R_p - R_e)^2 - 2R_eX_d + X_d^2]/2X_d \quad (19)$$

where $R_p$ is the radius of the probe which is used to make the various quantities dimensionless, $R_e = R_e/R_p$ is the radius of the edge and $X_d = x_d/r_p$ is the amount of indentation at the centerline 210. The point of tangency of the inner segment of the indented circular arc and the circular arc that defines the edge radius is given by $$X_t = X_d[R_e/(R_e + R_c)]$$

and $$Z_t = R_c[(R_p - R_e)/(R_e + R_c)],$$

where $X_t$ and $Z_t$ are the depth and vertical distance, respectively, to the point of tangency. For values of Z less than $Z_t$, the circle defined by $R_c$ is used to calculate the shape of the probe face by $$X = X_d - R_c - [R_c^2 - Z^2]^{\frac{1}{2}} \quad (20)$$

and for values of Z greater than $Z_t$, the edge circle is used to calculate the shape of the probe face by $$X = R_e - [R_e^2 - (Z - R_p + R_e)^2]^{\frac{1}{2}} \quad (21)$$

Computations were made on a series of probe shapes made up of circular arcs to determine the velocity at the orifice location on the forward centerline of the probes. A typical nose profile is shown in FIG. 7a and the results for a series of edge radii are presented in FIG. 7b. The point of tangency 50 between the inner segment of the indented circular arc and the circular arc defining the edge radius within the indentation is illustrated. Successive computer runs used values of $x_d/r_p$ interpolated from these results to find indentations that made the transverse free-stream velocity component at the orifice equal to $w_\infty$ to four decimal places (i.e., $W_{xf} = 1.0000$). Shape parameters required to achieve such a condition appear in Table I.

TABLE I

Values of circular-arc parameters that define probe shapes which have cosine-squared response of stagnation pressure to angle of incidence; $W_{xf} = 1.0000$.

| $\dfrac{r_e}{r_p}$ | $\dfrac{x_d}{r_p}$ | $\dfrac{dW_{xf}}{dX_d}$ | $\dfrac{r_c}{r_p}$ |
|---|---|---|---|
| 0.0 | 0.15565 | −1.18 | 3.29016 |
| 0.05 | 0.15420 | −1.22 | 2.95349 |

TABLE I-continued

Values of circular-arc parameters that define probe shapes which have cosine-squared response of stagnation pressure to angle of incidence; $W_{xf} = 1.0000$.

| $\dfrac{r_e}{r_p}$ | $\dfrac{x_d}{r_p}$ | $\dfrac{dW_{xf}}{dX_d}$ | $\dfrac{r_c}{r_p}$ |
|---|---|---|---|
| 0.1 | 0.14840 | −1.35 | 2.70331 |
| 0.2 | 0.13617 | −1.82 | 2.21809 |
| 0.3 | 0.12221 | −2.12 | 1.76585 |
| 0.4 | 0.10611 | −2.80 | 1.34941 |
| 0.5 | 0.08770 | −3.85 | 0.96916 |
| 0.6 | 0.06680 | −6.67 | 0.63100 |

Figure 7B:
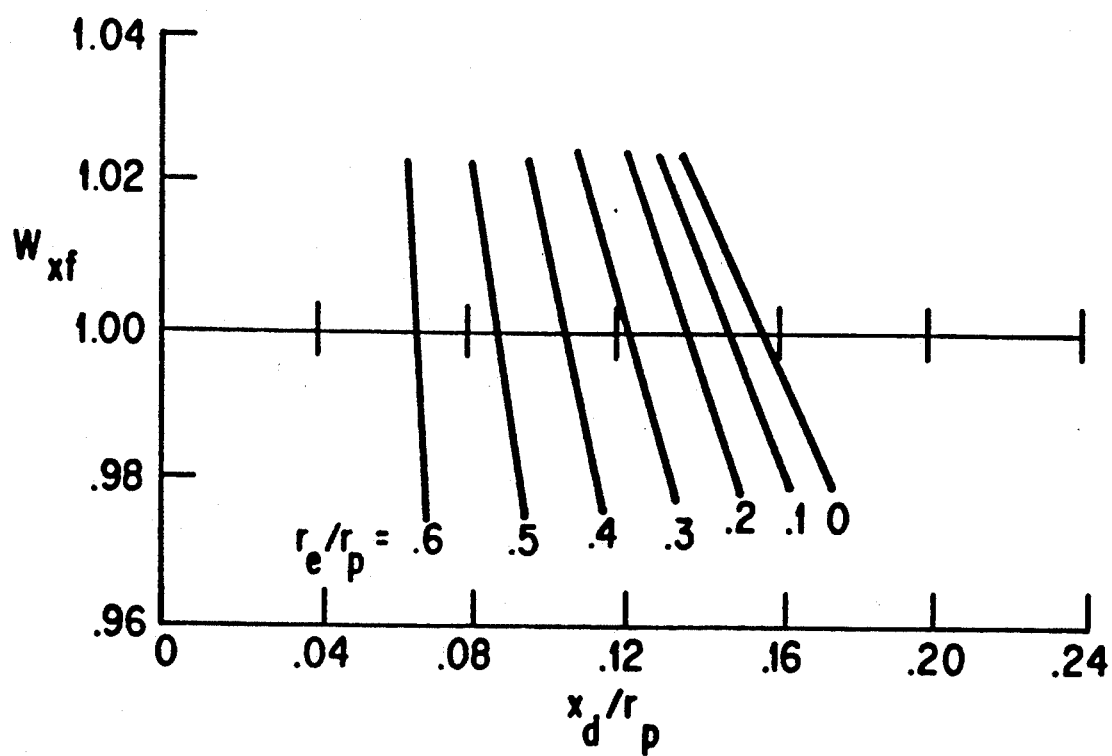

It is to be noted in FIG. 7b and in Table I that as the edge radius is increased (and the indented frontal area decreases) the cross-flow velocity at the orifice becomes more sensitive to indentation. This sensitivity is exhibited by the parameter $dW_{xf}/dX_d$ listed in Table I and presented graphically in FIG. 8 to show how sensitive the various shapes will be to construction errors. As expected, the larger edge radii are more sensitive to amount of indentation than the smaller edge radii. This situation is brought about by the fact that the larger edge radii allow less space for the indentation. As a consequence, more curvature in the probe face is present near the orifice location when larger edge radii are used to achieve the indentation needed for the desired $\cos^2\alpha$ relationship. In fact, when the edge radius is equal to or larger than $0.5r_p$, the circles that define the edge shape of the probes overlap and limit the depth of the indentation according to the equation.

$$X_d = R_e - [2R_e - 1]^{\frac{1}{2}} \quad (22)$$

From a purely theoretical point of view, the velocity vanishes at the intersection of the two edge circles, indicating that a value of $w_{xf}/w\infty = 1.0000$ is available. Since the indentation is of a very small radial extent, the variation with shape becomes so sensitive to construction errors that values above $R_e = 0.6$ are impractical.

Figure 9:
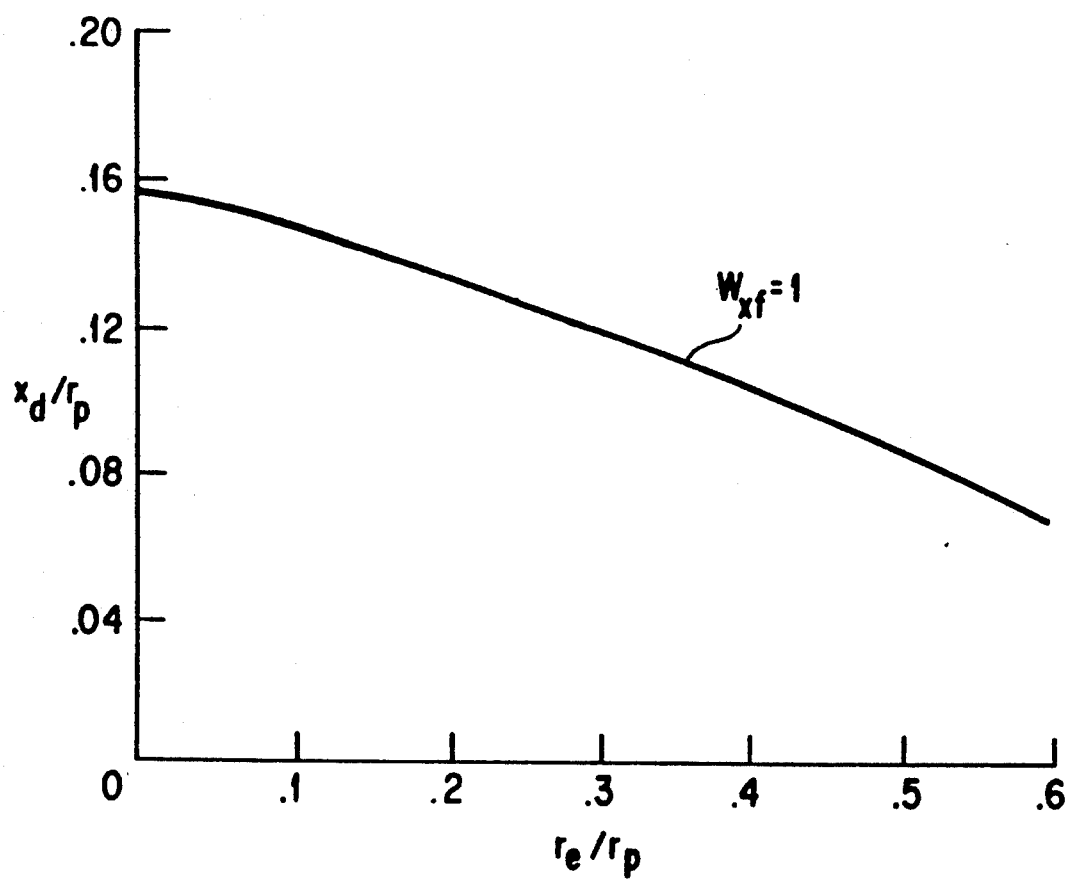
FIG. 9 is a graphical representation of the variation of an amount of indentation with edge radius.
Figure 10:
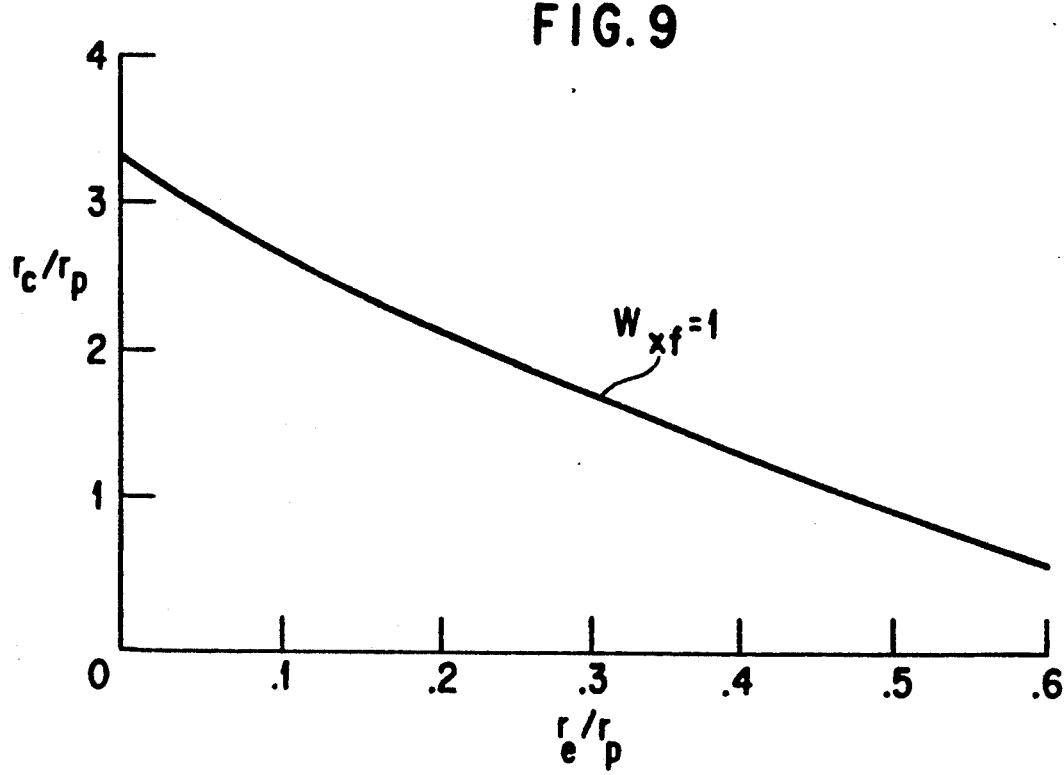
FIG. 10 is a graphical representation of the variation of centerline radius with edge radius.

In order to complete the presentation of the design parameters, the quantities $X_d$ and $R_c$ are plotted in FIGS. 9 and 10 for the condition that $W_{xf} = 1$. The shapes of the noses that correspond to the solutions presented in Table I are shown in FIGS. 11a–h. As exected, the radius of the circle defining the shape of the center of the probe rapidly becomes small at larger values of $R_e$. These results indicate that a wide range of shapes will produce a probe that has a $\cos^2\alpha$ variation in total head with angle of incidence. An optimum or preferred shape does not appear to be indicated. It is advisable, however, on the basis of fluid mechanics only, to choose medium values for the design parameters to achieve a compromise between possible flow separation and construction sensitivity. Such a compromise probably occurs for a value of the edge radius in the range $R_e = r_e/r_p = 0.2$ to 0.4. The velocity across the face of two such probes is presented in FIGS. 12a and b to illustrate how edge radius changes the region of nearly constant $W_{xf} = 1.0$ that exists near the centerline 200 of the probe.

Figure 12A:
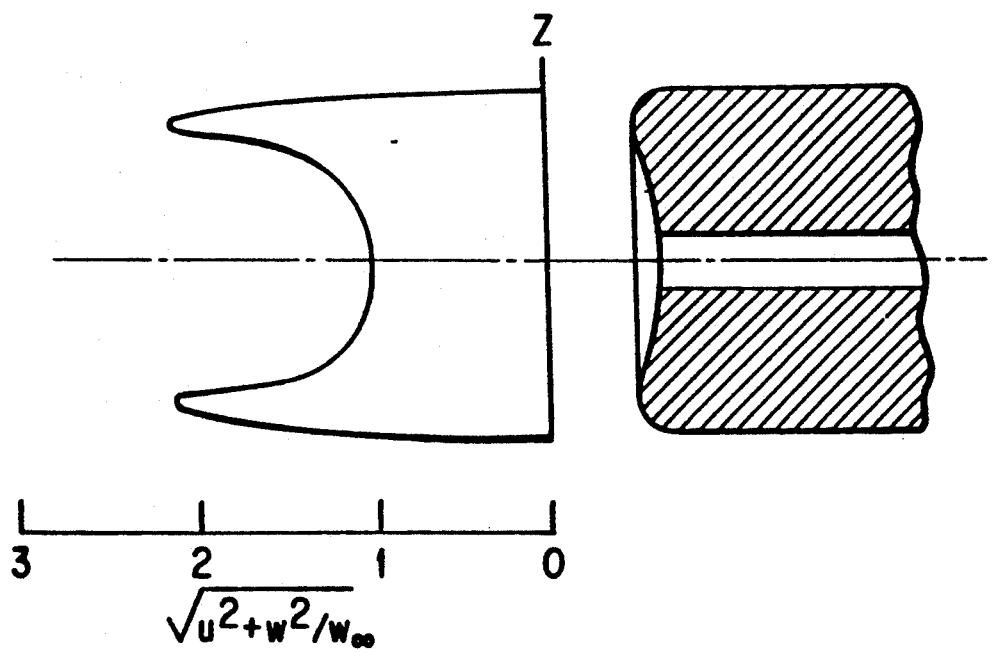
FIGS. 12a and 12b illustrate the velocity distribution on nose faces as a function of vertical distance for two shapes.

FIG. 12a illustrates a nose shape having an edge radius $R_e = r_e/r_p = 0.2$, an indentation $X_d = x_d/r_p = 0.138$ and a circle radius defining the shape of the center of the probe $R_c = r_c/r_p = 2.189$.

Figure 12B:
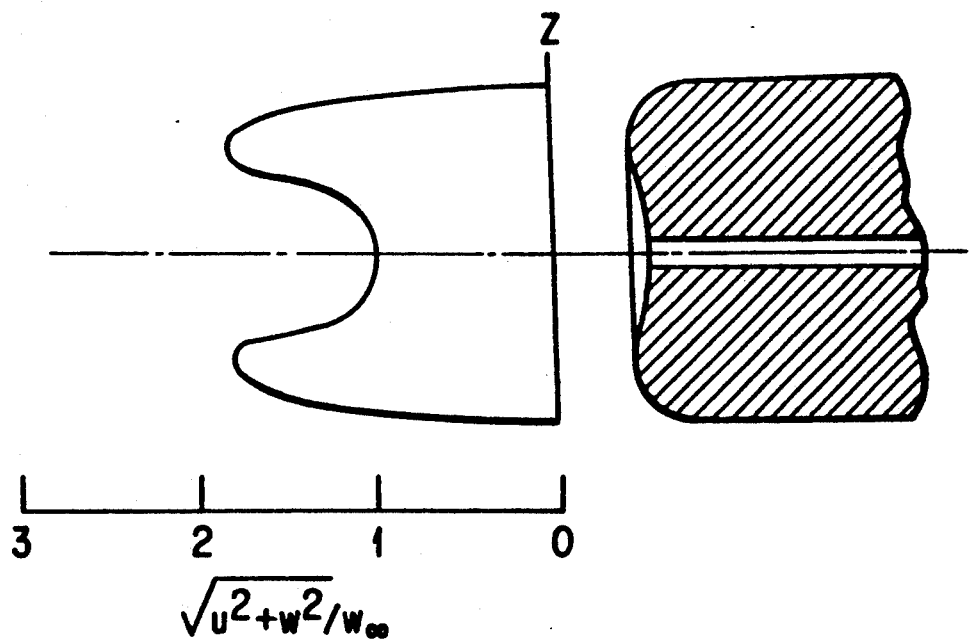

FIG. 12b illustrates a nose shape having an edge radius $R_e = r_e/r_p = 0.4$, an indentation $X_d = x_d/r_p = 0.107$ and a circle radius defining the shape of the center of the probe $R_c = r_c/r_p = 1.336$.

Obviously, the diameter of the orifice used to measure the stagnation pressure should be small enough that it does not extend beyond the radius where the transverse free-stream velocity component departs appreciably from $W_{xf} = 1.0$.

FIGS. 13a–13c illustrate a two-probe configuration 10 including a probe 14 of the invention. Both probes 12 and 14 are attached to the same support 16 to ensure that the measurements of probes 12 and 14 are near enough to each other that they are representative of a common point.

Figure 13D:
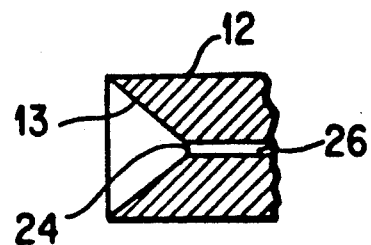
FIGS. 13d–13e are exploded views of the nose shapes of probes.
Figure 13E:
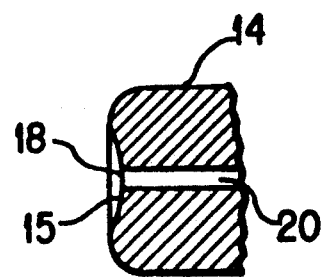

As shown in FIG. 13d, probe 12 is a known probe having an internal taper 13 that has a wide inflow acceptance angle. Probe 12 measures the total average stagnation pressure, $H_e$, i.e., the pressure attributable to the probe axis pressure plus the pressure caused by turbulence in the Y and Z axes. As shown in FIG. 13e, probe 14 has a smoothly contoured forward face 15 with a small amount of indentation sufficient to bring about a cosine-squared response.

Probe 12 has a flat response to the angle of incidence as distinguished from probe 14 which has a cosine-squared response to angle of incidence and measures only the streamwise stagnation pressure, i.e., the pressure along the X axis. The term "flat resposne" is a descriptive term distinguishing the response of probe 12 from the cosine-squared response of probe 14. The measurements from probe 12 and probe 14 are used in Eq. (12) to provide a measurement of cross-stream turbulence, i.e., the turbulence intensity along the Y and Z axes.

In FIG. 13b, probes 12 and 14 are the only elements shown in cross section. Probes 12 and 14 are secured to a support 16 having a wall 27 defining an inner chamber or cavity 28. The orifice 24 in probe 12 opens into a duct 26 extending through the length of probe 12 and situated on the probe centerline. A tube or conduit 31 passes through cavity 28 and couples the end of duct 26 remote from orifice 24 to a pressure sensor 34. Thus, the pressure encountered at orifice 24 is transmitted to pressure sensor 34 which generates an electric signal representative of the pressure. The orifice 18 in probe 14 communicates with duct 20 which extends the length of probe 14 along the longitudinal axis of the probe. A tube or conduit 32 interconnects the end of duct 20 remote from orifice 18 and a second pressure sensor 33. Pressure sensor 33 generates an electrical signal representative of the pressure at orifice 18. The orifices 18 and 24 preferably do not exceed 10% of their respective probe diameters to avoid pressure influences from the outer part of the probe radii which may cause deviations from ideal relationships.

Pressure sensors 33 and 34 are respectively connected to signal conditioners 36 and 37 which preferably include analog-to-digital converters and amplifiers. The signal conditioners are in turn coupled to a computer 38 which is programmed with equations described herein to provide the cross-stream turbulence intensity (as well as the parameter measured by each sensor).

Alternatively, a pressure sensor may be installed in each probe or duct rather than externally. In such an arrangement, the electrical leads from the probes would preferably pass through the interior of support 16 before reaching the signal conditioners. To reduce the number of signal conditioners and pressure sensors, pressure or electrical signal multiplexing can be employed.

The foregoing analysis specifies the shape of the probe in order to obtain a cosine-squared variation as a function of flow incidence angle. The probes must be manufactured with some accuracy in order to achieve engineering accuracy (e.g., three significant figures) in the variation of measured pressure with angle of incidence. Although the velocity at the orifice location is affected by the accuracy of the edge shape, it is probably not necessary to maintain high accuracy on the outer part of the probe shape. The most sensitive part of the probe face to construction accuracy is the indentation region. An estimate of the effect of errors in this region is available through the use of the parameter $dW_{xf}/dX_d$, as evaluated previously. From Eq. (15), $$dC_{pxf}/dX_d = -2W_{xf}[dW_{xf}/dX_d]\sin^2\alpha$$

Figure 8:
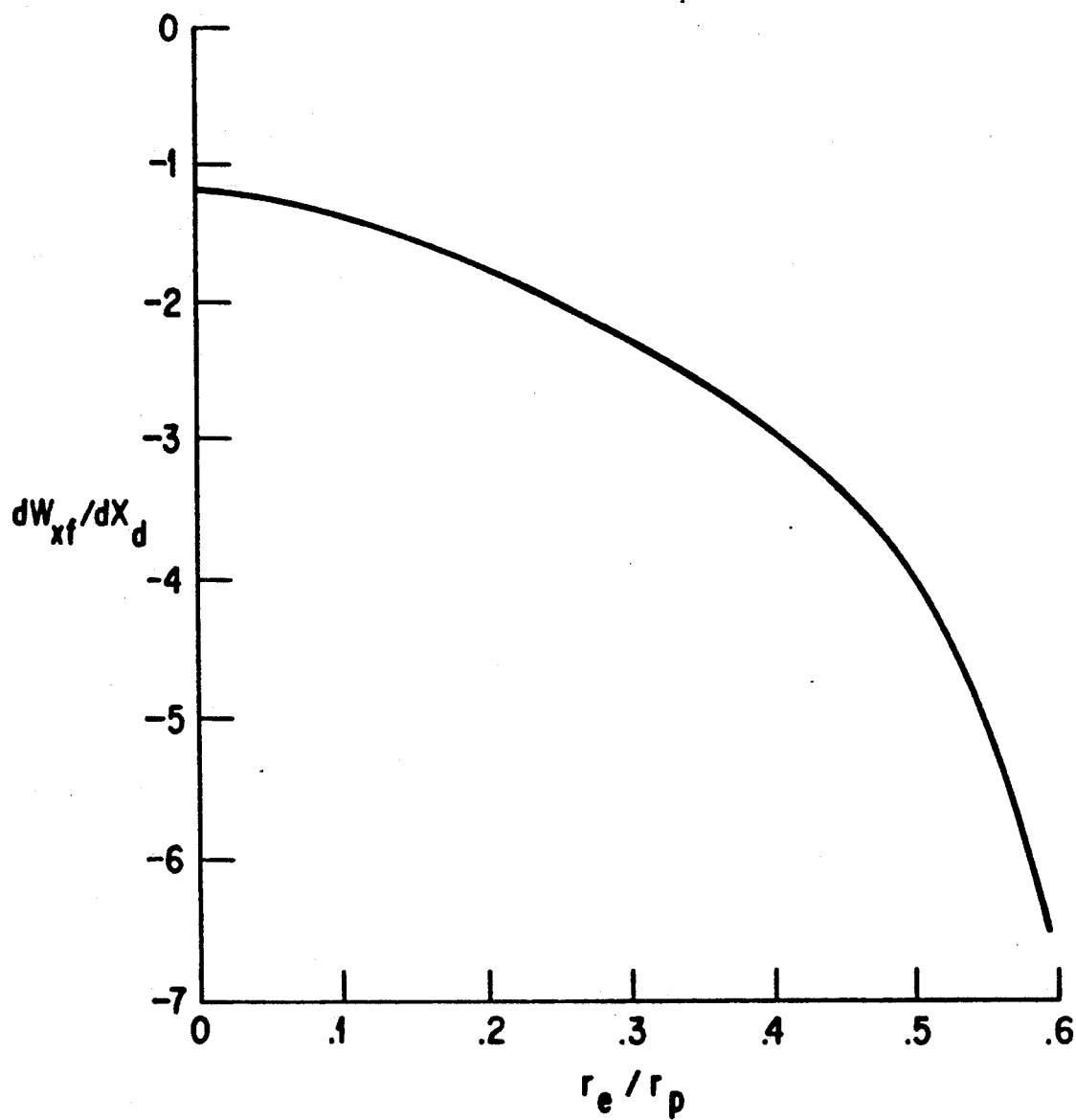
FIG. 8 is a graphical representation of the variation of sensitivity of centerline velocity to indentation.

Hence, the error in pressure coefficient due to an improper value of $X_d$ is directly proportional to the quantity $[dW_{xf}/dX_d]$, which is listed in Table I and plotted in FIG. 8.

Another approach is to again consider Eq. (15) and assume that an error in construction has caused $W_{xf}$ to be different from 1.0 by a small amount so that $W_{xf} = 1 + \epsilon$. The quantity $\epsilon$ would correspond to the quantity $[dW_{xf}/dX_d][\Delta X_d]$, where $[\Delta X_d]$ represents a construction inaccuracy. Eq. (15) then becomes $$C_{pxf} = 1 - (1+\epsilon)^2 \sin^2\alpha \approx \cos^2\alpha - 2\epsilon\sin^2\alpha$$

where $2\epsilon\sin^2\alpha$ expresses the deviation from the ideal variation to be expected when the surface is not as specified. At small angles of incidence, the errors in pressure are small, but as yaw increases to 20° or more, the error in pressure may become measurable.

The probe configuration according to the present invention incorporates several unique features. The probe may be axially symmetric with its axis or centerline aligned with the time-averaged direction of the oncoming stream as illustrated in FIGS. 3a and 3b. The tapered indentation in the front face of the probe is smoothly blended into the rest of the probe as illustrated in FIGS. 6a and 7a. The depth of the indentation is related to its radial extent and to the amount of rounding of the outer edge of the probe. The depth and radial extent of the indentation are determined as set forth above so that the total head response to the angle of incidence is as close to a cosine-squared relationship as possible. Thus, the total head indicated by the probe would vary with angle of incidence as the cosine-squared of that angle if the probe were placed in a laminar stream. This permits the probe to measure a pressure based on the dynamic pressure generated only by the streamwise component of the velocity and the static pressure, the measurement being directly related to the momentum in the streamwise direction.

The probe face joining the indentation is preferably smoothly rounded to its outer edge so that flow separation and other flow disturbances are minimized. The probe preferably has a circular cross-section of constant diameter downstream of the rounded surfaces of the outer edge of the probe.

While a specific probe shape has been described, any probe shape, whether axially symmetric or not, that has a single piece of material or a combination of pieces of material, could be used. The axially-symmetric or tubular configurations, while being the simlest to manufacture, are not required.

The probe configurations according to the present invention provide the pressure indications directly without requiring extensive analysis or assumptions regarding the flow field. The probe can be inserted into a turbulent stream and the true time-averaged stagnation pressure based on a streamwise component of velocity and the static pressure can be indicated directly by measured pressure. The probe is more convenient and accurate than previously used probes.

While this invention has been described in conjunction with specific embodiments thereof, many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A probe to be positioned in a turbulent fluid stream, said probe comprising:
    a pressure orifice located on a tapering indentation which is configured such that pressure in the stream indicate by the probe varies approximately in a cosine-squared relationship with an angle of incidence of the probe relative to the stream; and
    a pressure sensing means for providing an indication of pressure of said fluid stream at said pressure orifice, said probe having a duct extending therethrough and said pressure sensing means comprising a pressure measurement device, one end of said duct terminating in said pressure orifice at a terminal portion of said probe and an opposite end of said duct communicating with said pressure measurement device, said pressure measurement device being responsive to pressure variations in said duct, said pressure orifice being located on a central portion of a smoothly rounded tapering indentation at said terminal portion, said indentation facing an oncoming stream and the shape of said indentation establishing the cosine-squared relationship, said probe having a circular cross-section, and wherein said indentation has a radius of a circle $R_c$ given by:

$$R_c = ((R_p - R_e)^2 - 2R_e X_d + X_d^2)/2x_d,$$

where $R_p$ is the radius of the probe, $R_e$ is the radius of a forward edge of the probe and $X_d$ is the depth of said indentation at a centerline of said probe.

2. The probe as recited in claim 1, wherein said probe is axially symmetric about a centerline thereof.

3. The probe as recited in claim 1, wherein said pressure indicated by said probe is a streamwise stagnation pressure.

4. The probe as recited in claim 1, wherein $R_e$ is not greater than 0.6.

5. The probe as recited in claim 1, wherein $R_e$ is in the range of 0.2 to 0.4.

6. A probe system to be positioned in a turbulent fluid stream, comprising:
    a first probe, having a longitudinal axis and a pressure orifice, said first probe being configured such that pressure in the stream indicated by the probe varies approximately in a cosine-squared relationship with an angle of incidence of the probe relative to the stream;
    a second probe having a longitudinal axis and a pressure orifice, said second probe having a flat response to the angle of incidence, pressure responses from said first and second probes yielding indications of pressure that differ by the sum of the squares of turbulence intensities in a cross-stream direction, said cross-stream direction being substantially transverse to the longitudinal axes of said probes; and pressure sensing means for sensing said pressure responses to yield said pressure indications.

7. The probe system as recited in claim 6, wherein said pressure sensing means comprises a pressure measurement device and said first probe has a duct extending therethrough, one end of said duct terminating in said pressure orifice of said first probe at a terminal portion of said first probe and an opposite end of said duct communicating with said pressure measurement device, said pressure measurement device being responsive to pressure variations in said duct.

8. The probe system as recited in claim 7, wherein said pressure orifice of said first probe is located on a central portion of a smoothly rounded tapering indentation at said terminal portion, and the shape of said indentation establishes the cosine-squared relationship.

9. The probe system as recited in claim 8, wherein said first probe has a circular cross-section and wherein said indentation has a radius of a circle $R_c$ given by:

$$R_c = [(R_p - R_e)^2 - 2R_e X_d + X_d^2]/2X_d$$

where $R_p$ is the radius of the first probe, $R_e$ is the radius of a forward edge of the first probe and $X_d$ is the depth of said indentation at a centerline of said first probe.

10. The probe system as recited in claim 9, wherein $R_e$ is not greater than 0.6.

11. The probe system as recited in claim 9, wherein $R_e$ is in the range of 0.2 to 0.4.

12. The probe system as recited in claim 6, wherein said first probe is axially symmetric about a centerline thereof.

13. The probe system as recited in claim 6, wherein said first probe has a circular cross-section.

14. The probe system as recited in claim 6, wherein said second probe has a duct extending therethrough, said duct terminating in said pressure orifice of said second probe at a terminal portion of said second probe.

15. The probe system as recited in claim 14, wherein said pressure sensing means comprises a pressure measurement device and the terminal portion of said second probe is internally tapered, an opposite end of said duct communicating with sad pressure measurement device, said pressure measurement device being responsive to pressure variations in said duct.

16. The probe system as recited in claim 6, wherein said probe system further indicates turbulence intensity in said cross-stream direction.

17. A method for determining fluid characteristics of a turbulent stream, comprising:

placing in the turbulent stream at least one probe having a pressure orifice located on a tapering indentation which is configured such that pressure in the stream indicated by the probe varies approximately in a cosine-squared relationship with an angle of incidence of the probe relative to the stream, said probe having a longitudinal axis;

monitoring pressure response of said at least one probe using pressure sensing means to provide a direct measurement of streamwise stagnation pressure in the stream;

placing a second probe having a longitudinal axis and a pressure orifice in the turbulent stream, the second probe having a flat response to angle of incidence;

monitoring pressure responses from said probes; and determining turbulence intensities in a cross-stream direction substantially transverse to said longitudinal axes of said probes using said pressure responses.

18. A method of making a probe to be positioned in a turbulent stream, comprising;

providing the probe with a longitudinal axis, a pressure orifice located on a tapering indentation and pressure sensing means for indicating fluid pressure at said pressure orifice;

configuring the indentation such that pressure in the stream indicated by the probe varies approximately in a cosine-squared relationship with an angle of incidence of the probe relative to the stream including forming a smoothly rounded tapering indentation in a nose of said probe with said pressure orifice located centrally of said indentation; and forming said probe with a circular cross-section, and forming said indentation with a circular shape such that a radius $R_c$ of the indentation is defined as:

$$R_c = ((R_p - R_e)^2 - 2R_e X_d + X_d^2)/2x_d,$$

where $R_p$ is the radius of the probe, $R_e$ is the radius of a forward edge of the probe and $X_d$ is the depth of said indentation at a centerline of said probe.

19. The method as recited in claim 18, wherein $R_e$ is not greater than 0.6.

20. The method as recited in claim 18, wherein $R_e$ is in the range of 0.2–0.4.

21. The method as recited in claim 18, wherein the depth of said indentation is limited according to:

$$X_d = R_e - [2R_e - 1]^{\frac{1}{2}}$$

where $X_d$ is the depth of the indentation, and $R_e$ is the radius of a forward edge of the probe and is at least 0.5 $R_p$, where $R_p$ is the radius of the probe.

22. The method as recited in claim 18, further comprising forming said indentation by making computations on a series of probe shapes made up of circular arcs to determine velocity at the pressure orifice and, by successive computer runs, selecting the indentation for which transverse velocity at the orifice is substantially equal to velocity in a cross-stream direction substantially transverse to the longitudinal axis of said probe at a location spaced from the probe.

23. The method as recited in claim 18, wherein said indentation is selected from a family of shapes wherein:

$$X = CZ^2(1 - Z^2) \, lxn \, (\cos \pi Z/2)$$

where X is the depth of the indentation, Z is the radius of the indentation, C is a constant, and a value of C is chosen which will yield a component of the free-stream velocity transverse to the probe axis at said pressure orifice, $W_{xf}$, substantially equal to 1.0, where $W_{xf} = w_{xf}/w \infty$, where $w_{xf}$ is a velocity across a centerline of the probe and $W \infty$ is a velocity in a cross-stream direction substantially transverse to he longitudinal axis of the probe at a location spaced from the probe.

24. The method as recited in claim 23, wherein the value of C is substantially 0.62717.

* * * * *